(12) United States Patent
Van De Schaar-Mitrea et al.

(10) Patent No.: US 6,175,386 B1
(45) Date of Patent: Jan. 16, 2001

(54) TELEVISION PICTURE SIGNAL PROCESSING IN WHICH VIDEO AND GRAPHIC SIGNALS ARE COMPRESSED USING DIFFERENT COMPRESSION ALGORITHMS STORED IN A SAME MEMORY, AND DECOMPRESSED FOR DISPLAY

(75) Inventors: Mihaela Van De Schaar-Mitrea; Peter H. N. De With, both of Eindhoven (NL)

(73) Assignee: U.S. Philips Corporation, New York, NY (US)

( * ) Notice: Under 35 U.S.C. 154(b), the term of this patent shall be extended for 0 days.

(21) Appl. No.: 09/090,001

(22) Filed: Jun. 2, 1998

(30) Foreign Application Priority Data

Jun. 3, 1997 (EP) .................................................. 97201657

(51) Int. Cl.[7] ............................ H04N 5/445; H04N 9/74; H04N 5/21
(52) U.S. Cl. ......................... 348/563; 348/589; 348/600; 348/607
(58) Field of Search ..................................... 348/563, 589, 348/598, 600, 607, 569, 568, 567, 468, 581; 382/233, 244, 232; H04N 5/445, 9/74, 9/76, 5/21

(56) References Cited

U.S. PATENT DOCUMENTS

| 5,119,200 | 6/1992 | Van Den Hombergh et al. | 358/188 |
| 5,448,307 | 9/1995 | Gelissen et al. | 348/584 |
| 5,926,611 | * 7/1999 | Yang | 348/397 |

* cited by examiner

Primary Examiner—Sherrie Hsia
(74) Attorney, Agent, or Firm—Edward W. Goodman

(57) ABSTRACT

Field or frame memories are often used in television receivers for video signal processing functions, such as noise reduction and/or flicker reduction. Television receivers also have graphic features such as teletext, menu-driven control systems, multilingual subtitling, an electronic TV-Guide, etc. In a method of processing television picture signals including both video (VID) and graphic (GFX) information, the video and graphic signals are individually compressed in accordance with different (lossy and loss-less, respectively) compression algorithms (22;24), stored in the same field or frame memory (21), and decompressed (23;25) after processing (20). As such, a significant reduction of memory capacity is achieved without adversely affecting the graphics quality. The method is not only applicable to locally generated graphic signals (TXT,OSD) but also to graphic information which is detected (26) as being embedded in a received television signal.

9 Claims, 5 Drawing Sheets

TELEVISION PICTURE SIGNAL PROCESSING IN WHICH VIDEO AND GRAPHIC SIGNALS ARE COMPRESSED USING DIFFERENT COMPRESSION ALGORITHMS STORED IN A SAME MEMORY, AND DECOMPRESSED FOR DISPLAY

BACKGROUND OF THE INVENTION

1. Field of the Invention

The invention relates to a method of processing a television picture signal including video and graphic information, said processing comprising the step of storing the television picture in a picture memory. The invention also relates to a television receiver adapted to carry out such a method.

2. Description of the Related Art

Current television receivers show an increased use of digital signal processing circuits for features, such as noise reduction and/or flicker reduction. Generally, the receivers have a picture memory for that purpose. Television receivers also have additional features, such as teletext reception, sophisticated menu-driven control systems, multilingual subtitling, electronic TV-Guide facilities, etc. These additional features require on-screen-display of graphic information. Often, this graphic information is generated by character-based graphics devices which require a moderate memory capacity. However, there is a trend towards enhanced graphics devices which define graphic information on a pixel-by-pixel basis and require a large memory capacity.

Needless to say, that it is important to reduce the memory capacity in such television receivers, for example, by using a shared memory for the various functions. A television receiver having such a shared memory is disclosed in U.S. Pat. No. 5,119,200. This prior art comprises a picture memory for storing the received video signal as well as the locally generated graphics (teletext) signal. The receiver utilizes the fact that a pixel on the screen either represents video information or graphic information. One bit per pixel is stored in the memory to indicate the type of information. The prior-art receiver allows the video information in the memory to be refreshed and processed at the field or frame rate without affecting the stored graphic information.

OBJECT AND SUMMARY OF THE INVENTION

It is an object of the invention to further reduce the memory capacity in such a television receiver.

To that end, a method of processing a television picture signal including video and graphic information is provided, said processing comprising the step of storing the television picture in a picture memory, characterized by compressing the video information and graphic information in accordance with different compression algorithms, and storing the compressed video and graphic information in said picture memory. Preferably, both types of compressed information are stored in the same memory.

The invention will be appreciated if it is realized that applying a certain compression algorithm to video as well as graphic information generally results in different artifacts and compression ratios for the different types of information. The invention is based on experiments which show that a compression algorithm which is adequate for one type of information, in terms of data reduction and coding artifacts, may be disastrous for another type of information. The perception of the signals is totally different. Often, graphic information is text, the legibility of which is of crucial interest. For video, natural behavior of moving objects and a sufficient signal-to-noise ratio are important. For example, MPEG-compression of video information yields satisfactory results because it is based on average video statistics. However, applying the same MPEG-compression to graphics leads to a considerable degradation of the graphic picture quality. This is felt to be unacceptable because consumers have meanwhile become used to very high quality teletext and on-screen-display images.

Preferably, the video information is subjected to a lossy compression algorithm, and the graphic information is subjected to a loss-less compression algorithm. Data reduction of the television signal is achieved herewith while the high quality of the graphic information is preserved in conformity with the consumer's expectations.

The invention is not restricted to receivers in which the graphic information is locally generated, inter alia, in the form of teletext pages or on-screen menus. Video information and graphic information can also be mixed at the transmitter end. Television stations insert their logos in the transmitted picture and use sophisticated graphic devices for program captions and subtitles. Popular quiz programs are based on simultaneously showing the players and the electronically generated game field with the players' scores. Further, with the advance of interactive TV and video-on-demand, video images will often be mixed with graphic menus. In order to also reduce the memory requirements for these television pictures, while maintaining the high quality of the embedded graphic information, an embodiment of the invention further comprises the step of determining the type of information in a given picture area on the basis of a predetermined property of the television picture signal in said picture area. The television receiver now automatically detects whether the information in a picture area (for example, a rectangular block of pixels) is video information or graphic information, and selects the appropriate compression strategy for that area, accordingly. An example of a property of the television picture signal is the amount of uniformity between pixel values in a given image area. The determination of the type of information in a picture area can be improved by taking account of the type of information in adjacent (spatially or temporally) picture areas.

DESCRIPTION OF THE PREFERRED EMBODIMENTS

Figure 1:
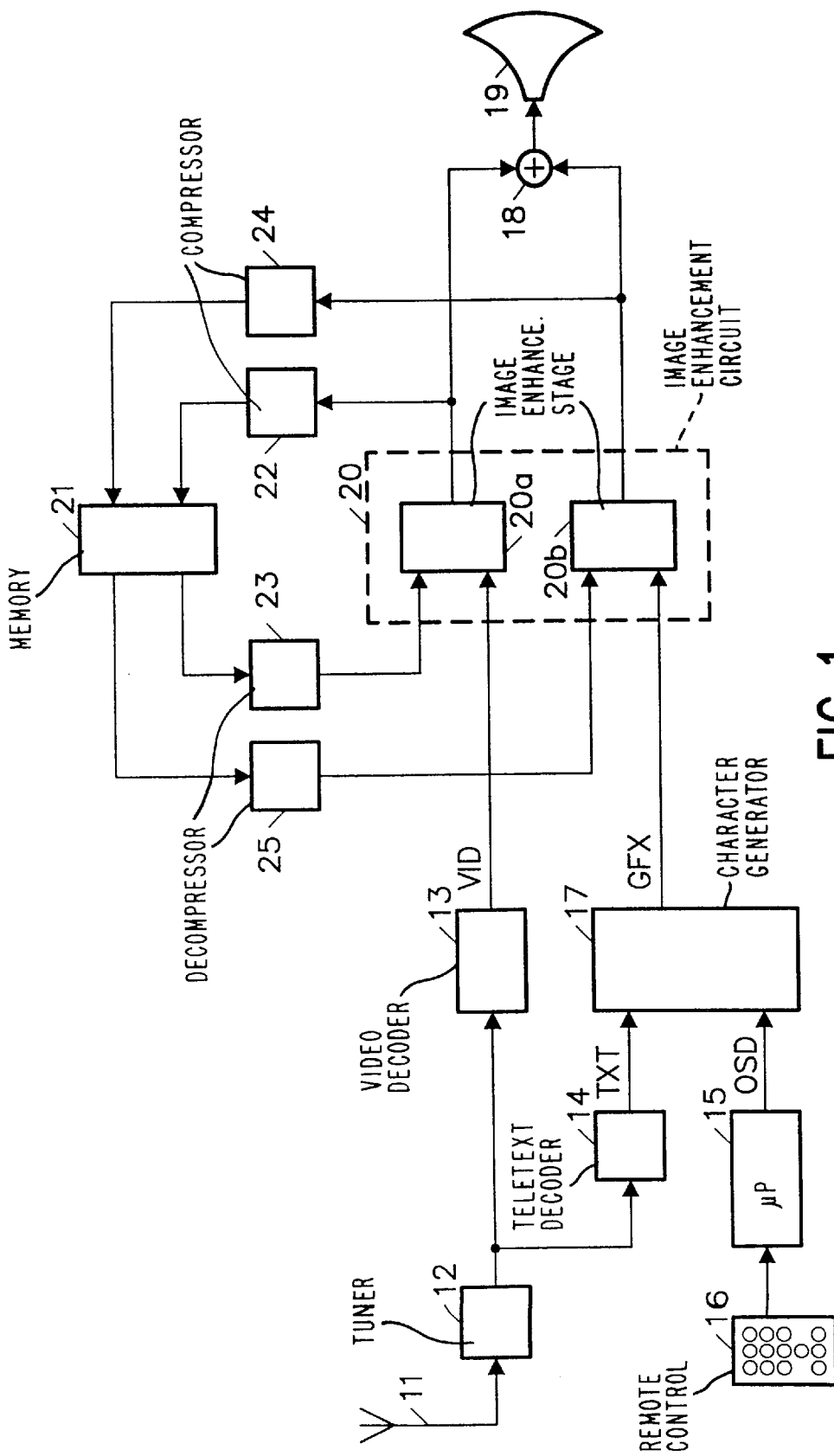
FIGS. 1–3 show embodiments of a television receiver in accordance with the invention.

FIG. 1 shows a television receiver in accordance with the invention. The receiver comprises an antenna 11 and a tuner 12 for receiving a desired television signal. The received television signal is applied to a video decoding circuit 13 for obtaining video information VID in the form of luminance and color signals. The television signal is also applied to a teletext decoder 14 for decoding teletext data TXT which is transmitted in the vertical blanking interval of the television signal. The term teletext as here employed should be understood to mean any kind of information that is transmitted in encoded form along with a television signal, including electronic program guide information or data associated with an interactive television program.

The receiver comprises a microprocessor 15 which receives user commands from a (remote) control unit 16 and controls the operation of the receiver in a further known manner. More particularly, the microprocessor is arranged to generate onscreen-display data OSD representing, inter alia, menus to be displayed on the receiver's screen. The on-screen-display data OSD and/or teletext data TXT are applied to a character generator 17 pixel-wise which generates displayable graphics information GFX at the relevant frame rate for display on the screen. In a conventional television receiver, the video information VID and graphic information GFX are directly applied to a display screen 19 through a combining circuit 18 for simultaneous display on the screen. The receiver further comprises an image-enhancement circuit 20 for, inter alia, PALplus decoding (for reducing artifacts such as cross-color and cross-luminance), noise reduction (by recursively filtering pixels of successive frames) or flicker reduction (by motion compensated frame rate doubling). The image-enhancement circuit 20 is coupled to a field or frame memory 21.

In accordance with the invention, the video information VID and graphic information GFX are separately compressed before being stored in the memory 21, and decompressed thereafter. A first compression stage 22 for compressing the video information VID is connected to the input of memory 21, and a first decompression stage 23 for decompressing the video information VID is connected to the output of memory 21. Similarly, a second compression stage 24 for compressing the graphic information GFX is connected to the input of memory 21, and a second decompression stage 25 for decompressing the graphic information GFX is connected to the output of memory 21. Compression and decompression are carried out in real-time, i.e., at the relevant field- or frame rate.

The compression and corresponding decompression stages are selected to have an optimum performance for the respective type of information. The video information VID is preferably compressed in accordance with a lossy compression algorithm, such as Adaptive Dynamic Range Coding (ADRC), which is a type of block-predictive coding, or transform coding with (adaptive) quantization of the transform coefficients. The graphic information GFX is preferably compressed in accordance with a loss-less compression algorithm, such as run-length coding, contour coding or template coding. All these compression methods are known per se in the art and need no further explanation.

Generally, the image-enhancement circuit 20 applies the same signal-processing algorithm (for example, field rate doubling from 50 Hz to 100 Hz) to both the video and graphic information. However, it is a feature of the invention that the video and graphics information can easily be subjected to different image-enhancement algorithms. For example, the degree of noise reduction may be less for the video information than for the more static graphic information. In FIG. 1, this is shown by means of two distinct image-enhancement stages 20a and 20b, respectively.

Figure 2:
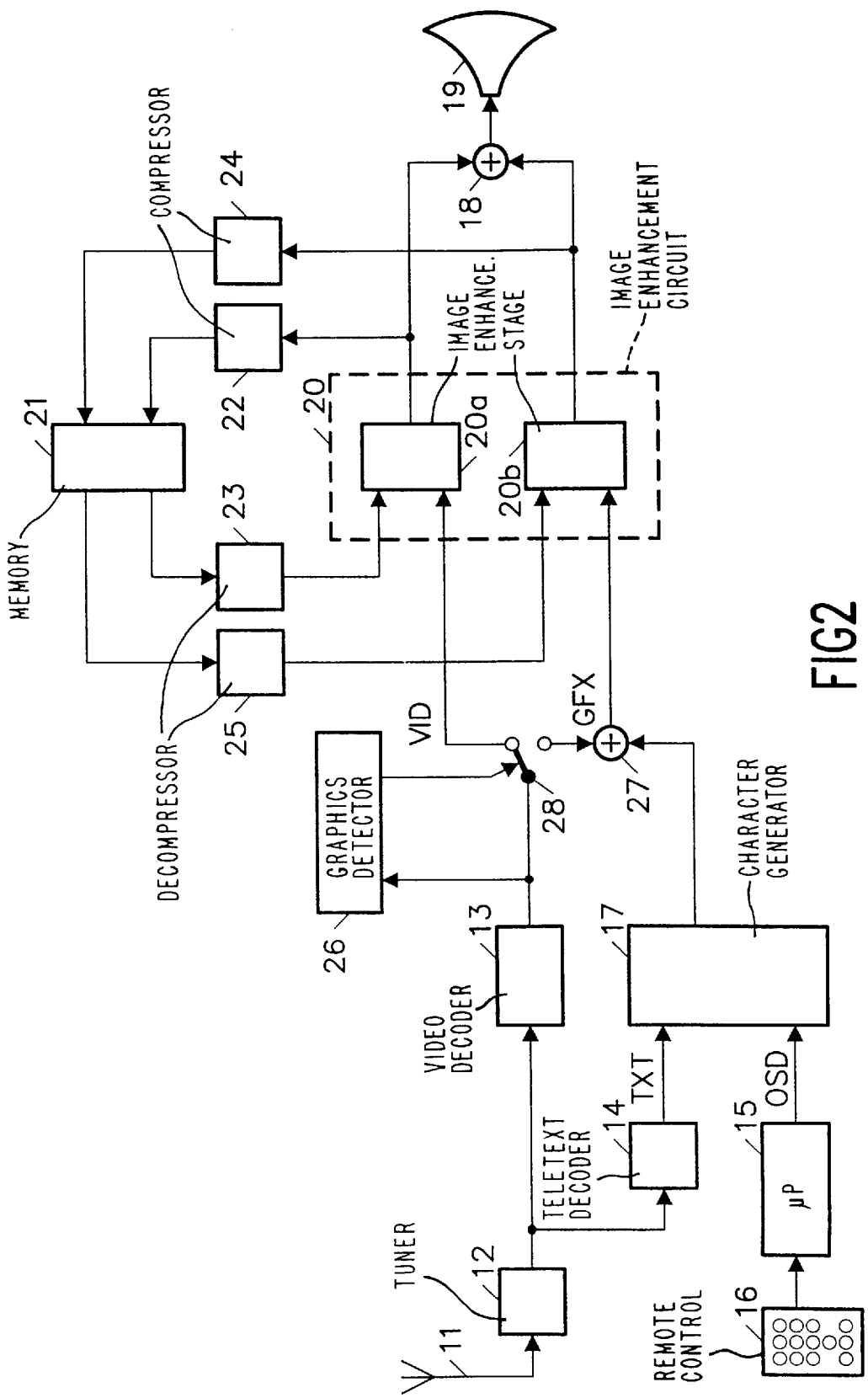
Figure 3:
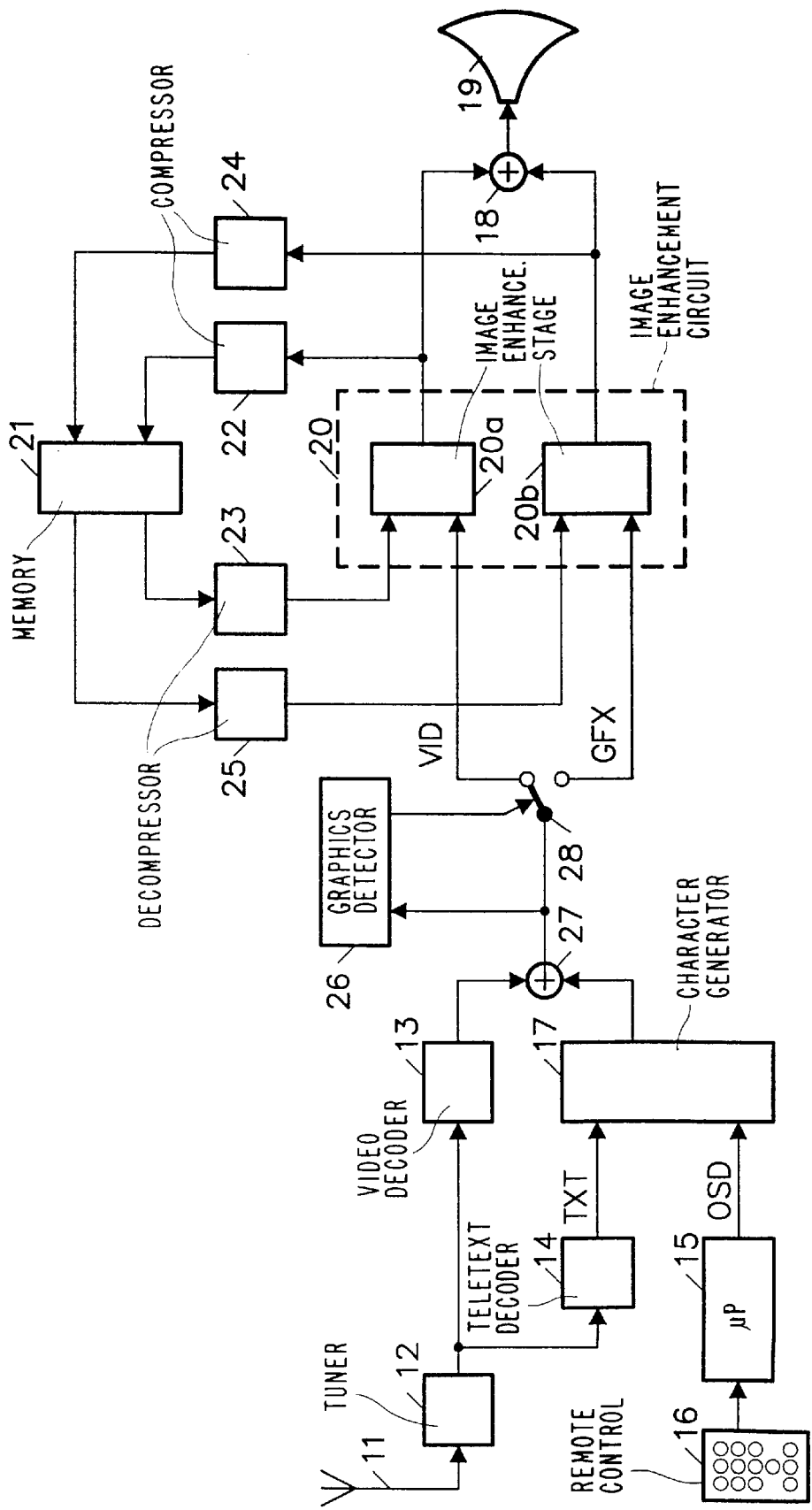

FIGS. 2 and 3 show further embodiments of a television receiver in accordance with the invention. The same reference numerals are used for circuits which have already been shown in FIG. 1. A characteristic feature of these embodiments is detection of graphic information is embedded in the received television signal by a graphics detection circuit 26. Graphic information is very often broadcast in the form of, inter alia, transmitter station logos, program captions, subtitles, game fields in a quiz show, etc. In the embodiment shown in FIG. 2, the graphics detection circuit 26 receives the broadcast signal from the video decoding circuit 13. In a manner which will be described hereafter, the graphics detection circuit detects whether the broadcast signal represents video or graphic information and controls a splitting device 28 in response to said detection. The device 28 separates the graphic information embedded in the broadcast signal from the video information. The video information VID is applied to the video compression stage 22. The embedded graphic information is combined with the locally generated graphic information via a combining circuit 27. The combined graphic information GFX is then applied to the graphics compression stage 24. In the embodiment shown in FIG. 3, the broadcast signal from the video decoding circuit 13 and the graphic signal from the character generator 17 are first combined by the combining circuit 27. The combined signal is then applied to the graphics detection circuit 26 and separated into video information VID and graphic information GFX.

Figure 4:
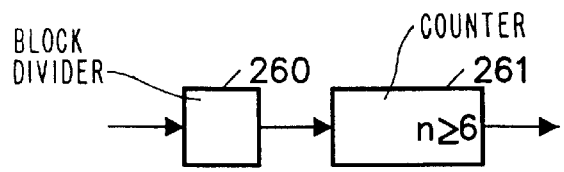
FIGS. 4–6 show schematic diagrams of embodiments of a graphics detection circuit which is shown in FIG. 2.

FIG. 4 shows a schematic diagram of an embodiment of the graphics detection circuit 26. It comprises block division means 260 for dividing the applied picture into blocks of, for example, 4*4 pixels. The division into rectangular blocks is not essential but is connected with the video-compression algorithm which is also based on block coding. The detection circuit further comprises means 261 for counting the number n of adjacent pixels having the same pixel (i.e., luminance and/or color) value. The counter 261 has an output $n \geq 6$ which indicates that the number of adjacent pixels having the same value is 6 or more. The output $n \geq 6$ is the output signal of the detection circuit. Accordingly, a block having more than a predetermined number of adjacent identical pixels is considered to be a graphics block. Otherwise, it is considered to be a video block. The output of the detection circuit controls the splitting device 28 (FIGS. 2 and 3). Graphics blocks are thus loss-less encoded, irrespective of whether they also include video pixels or not. Video blocks are lossy compressed.

Figure 5:
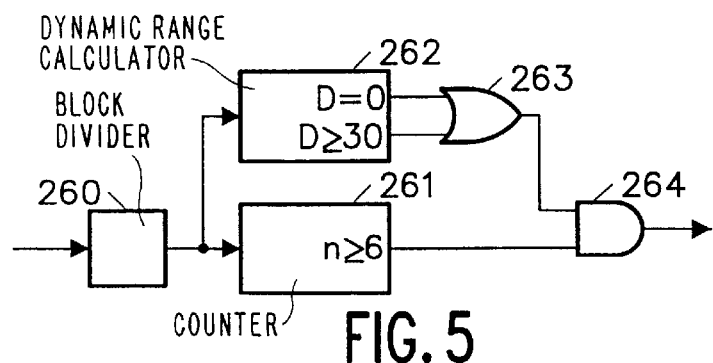

FIG. 5 shows a further embodiment of the graphics detection circuit. The performance of the graphics detection is improved by also taking into account the dynamic range D (i.e., the distance between minimum and maximum) of the pixel values within a block. Graphic blocks are characterized by a large dynamic range, usually exceeding 30. However, a block in which all pixels have the same value, which has a dynamic range of zero, forms on exception to this rule. In accordance herewith, the embodiment shows in FIG. 4 comprises means 262 for calculating the dynamic range. The calculator 262 has an output $D \geq 30$ indicating that the dynamic range is equal to or larger than 30, and another output D=0 indicating that the dynamic range is zero. Both outputs are OR-ed by an OR-gate 263. The output of the OR-gate is AND-ed by an AND-gate 264 with the output $n \geq 6$ of counter 261. Accordingly, a block is considered to be a graphics block if the number of adjacent identical pixels exceeds 6 and the dynamic range is either large or zero.

Figure 6:
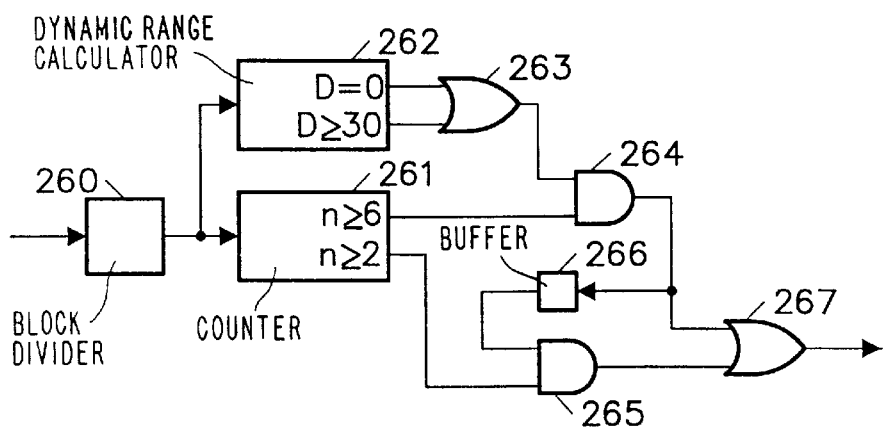

FIG. 6 shows a further embodiment of the graphics detection circuit. In this embodiment, the output of the AND-gate 264 (indicating that the block is a graphics block) is stored in a buffer 266. The counter 261 has a further output $n \geq 2$ indicating that the number of adjacent pixels having the same pixel value is 2 or more. Said output is AND-ed, by an AND-gate 265, with the type of an adjacent block stored in the buffer memory 266. Accordingly, a block comprising only 2, 3, 4 or 5 identical adjacent pixels is now also considered to be a graphics block if it is adjacent to a 'real' graphics block (a block having 6 or more identical adjacent pixels). Both criteria for a graphics block are then OR-ed by an OR-gate 267.

Figure 7:
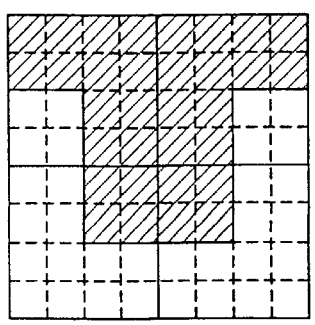
FIG. 7 shows an example of a graphic character in a video background to illustrate the operation of the detection circuits shown in FIGS. 3–5.

FIG. 7 shows, by way of an example, a graphic character ("T") in a video background to illustrate the operation of the detection circuit. The two upper 4*4 blocks comprise 12 identical adjacent graphic pixels and are thus considered to be 'real' graphics blocks. The two lower 4*4 blocks comprise 4 identical adjacent pixels. The embodiments of FIGS. 4 and 5 detect that both lower blocks are video blocks. The embodiment of FIG. 6 detects that they are graphics blocks because they are adjacent to 'real' graphics blocks. The embodiment of FIG. 6 thus avoids that borders of graphic image areas are adversely affected by lossy compression.

It will be appreciated that the embodiments of the graphics detector shown in FIGS. 4–6, although shown in the form of hardware circuits, can also be (partly) implemented in the form of a programmed microprocessor.

As the object of the invention is to reduce memory capacity in a television receiver, a certain compression factor is to be achieved. For example, a compression factor 2 may be desired. The television receiver comprises a bit-rate controller to ensure that each compressed image fits in the available memory capacity. It is advantageous to take the amount of compressed graphics data for granted, and apply the bit-rate control to the (lossy) video compression only. The video compressor is then controlled to produce a target number of bits, said target being determined in dependence on the amount of graphics data. The receiver may be arranged to switch to a security mode in which lossy compression is applied to both video and graphics if there is insufficient memory capacity available for video.

Figure 8:
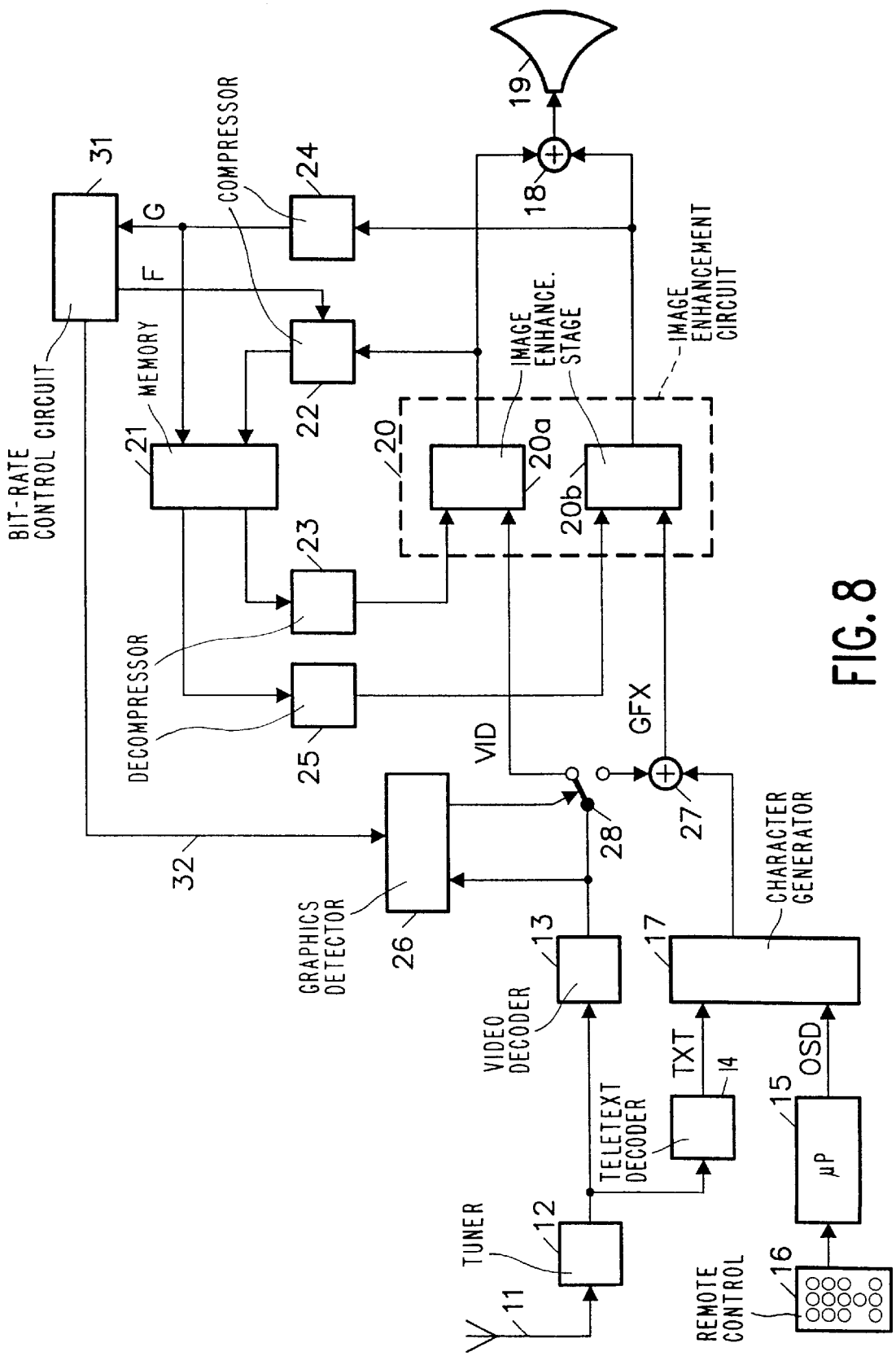
FIG. 8 shows a further embodiment of a television receiver in accordance with the invention.

An embodiment implementing the above bit-rate control strategy will now be described with reference to the television receiver shown in FIG. 8 which largely corresponds to the receiver shown in FIG. 2. The receiver comprises a bit-rate control circuit 31 which receives, from the graphics compressing stage 24, the number of bits G which have been spent for encoding the graphic information in the previous frame. It is assumed that the graphics in the current frame resembles that in the previous frame. The available number of bits V for encoding the video information is then:

$$V=C-G$$

in which C represents the capacity of the memory 21 of the television receiver. The bit rate control circuit checks whether V is larger than a predetermined minimum value. If that is the case, the bit rate control circuit calculates a compression factor F, which is defined as:

$$F = \frac{\text{uncoded number of video bits}}{V}$$

In the present example, the capacity of memory 21 is assumed to be half that required for storing uncompressed video. Accordingly, the compression factor F must at least be equal to 2. If it is below 2, F will be set to 2. The compression factor thus calculated is applied to the video compression stage 22 which controls the quantization in a further known manner, such that the desired compression is achieved.

If the available number of bits V is below the predetermined minimum value, a control signal is generated to cause the whole image to be lossy encoded. In the Figure, this control signal is shown in the form of a connection 32 to the graphics detection circuit 26 which controls the switch 28 to feed the whole image to the lossy compressing stage 22. At the same time, the compression factor F is set to 2 which guarantees that the whole image will fit in the memory. The graphics information is nevertheless loss-less encoded (but not stored) so as to provide the value of G for the next frame.

Field or frame memories are often used in television receivers for video signal processing functions, such as noise reduction and/or flicker reduction. Television receivers also have graphic features such as teletext, menu-driven control systems, multilingual subtitling, an electronic TV-Guide, etc.

A method of processing television picture signals including both video (VID) and graphic (GFX) information is disclosed. In accordance with the invention, the video and graphic signals are individually compressed in accordance with different (lossy and loss-less, respectively) compression algorithms, stored in the same field or frame memory, and decompressed after processing. Herewith, a significant reduction of memory capacity is achieved without adversely affecting the graphics quality. The invention is not only applicable to locally generated graphic signals (TXT,OSD) but also to graphic information which is detected as being embedded in a received television signal.

What is claimed is:

1. A method of processing a television picture signal including video and graphic information, said method comprising the step of storing the television picture signal in a picture memory, characterized in that said method further comprises the steps:

compressing the video information and graphic information in accordance with different compression algorithms;

controlling the compression so as to obtain a predetermined number of bits for storing the picture in said memory, wherein the video compression is controlled to obtain a target number of bits, said target number being determined in dependence on the amount of compressed graphic information; and storing the compressed video and graphic information in said picture memory.

2. The method as claimed in claim 1, wherein the video information is subjected to a lossy compression algorithm, and the graphic information is subjected to a loss-less compression algorithm.

3. The method as claimed in claim 1, characterized in that the method further comprises the step:

determining whether the information in a given picture area is video information or graphic information on the basis of a predetermined property of the television picture signal in said picture area.

4. The method as claimed in claim 3, wherein said property is the degree of uniformity between pixel values within said picture area.

5. The method as claimed in claim 3, wherein said property is the dynamic range of pixel values within said picture area.

6. The method as claimed in claim 3, wherein said determining step is further dependent on whether the information in adjacent picture areas is video information or graphic information.

7. The method as claimed in claim 1, wherein the video and graphic information are subject to different signal processing algorithms.

8. A television receiver comprising signal processing means for processing a television picture signal including video and graphic information, said processing means including a memory for storing the television picture signal, characterized in that the television receiver further comprises:

compression means for compressing the video information and graphic information in accordance with different compression algorithms;

means for controlling the compression so as to obtain a predetermined number of bits for storing the picture in said memory, wherein the video compression is controlled to obtain a target number of bits, said target number being determined in dependence on the amount of compressed graphic information; and means for storing the compressed video and graphic information in said memory.

9. A television receiver comprising:

a first input for receiving a television signal including both video information and graphic information, and a second input for receiving further graphic information;

signal processing means for processing video signals, said signal processing means comprising a first stage for processing video information, and a second stage for processing graphic information, said first and second stages performing a same type of processing with different parameters;

means for applying the further graphic information to the second stage of said signal processing means;

means, coupled to said first input, for detecting the graphic information in said television signal;

means, responsive to said detecting means, for applying the video information in said television signal to the first stage of said signal processing means, and for applying the graphic information in said television signal to the second stage of said signal processing means;

first compression means, coupled to an output of the first stage of said signal processing means, for compressing the video information, and second compression means, coupled to an output of the second stage of said signal processing means, for compressing the graphic information, said first and second compression means having different compression algorithms;

a memory coupled to respective outputs of said first and second compression means for storing the compressed video and graphic information;

first and second decompression means coupled to said memory for decompressing said stored compressed video and graphic information, respectively, said first and second decompression means having different decompression algorithms complementary to the different compression algorithms of the first and second compression means, respectively, said first and second decompression means having outputs coupled to inputs of the first and second stages, respectively, of said signal processing means;

combining means coupled to the outputs of the first and second stages of said signal processing means; and a television display coupled to an output of said combining means for displaying the graphic information and the video information.

* * * * *